(12) United States Patent
Bradley et al.

(10) Patent No.: US 12,498,041 B2
(45) Date of Patent: Dec. 16, 2025

(54) GEARBOX SHIFT LOCKOUT SYSTEM

(71) Applicant: Delaware Capital Formation, Inc., Wilmington, DE (US)

(72) Inventors: Bobby Bradley, Jenks, OK (US); Daryl Toole, Broken Arrow, OK (US); Tony Jones, Bixby, OK (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 18/628,203

(22) Filed: Apr. 5, 2024

(65) Prior Publication Data

US 2025/0060032 A1 Feb. 20, 2025

Related U.S. Application Data

(60) Provisional application No. 63/457,225, filed on Apr. 5, 2023.

(51) Int. Cl.
| | | |
|---|---|---|
| *F16H 61/16* | (2006.01) | |
| *F16H 3/46* | (2006.01) | |
| *F16H 59/38* | (2006.01) | |
| *F16H 61/30* | (2006.01) | |
| *F16H 61/32* | (2006.01) | |
| *F16H 59/68* | (2006.01) | |
| *F16H 61/28* | (2006.01) | |

(52) U.S. Cl.
CPC .............. *F16H 61/16* (2013.01); *F16H 3/46* (2013.01); *F16H 59/38* (2013.01); *F16H 61/30* (2013.01); *F16H 61/32* (2013.01); *F16H 2059/6853* (2013.01); *F16H 61/2807* (2013.01); *F16H 2061/2853* (2013.01); *F16H 2200/0034* (2013.01); *F16H 2200/2005* (2013.01); *F16H 2200/2007* (2013.01)

(58) Field of Classification Search
CPC .... F16H 61/16; F16H 3/46; F16H 2061/2853; F16H 2200/0034; F16H 2200/2005; F16H 2200/2007; F16H 61/2807; F16H 3/48; F16H 3/56; F16H 59/38; B60W 10/14; B60W 30/18045
USPC ............. 701/60, 62; 475/338, 339, 340, 298
See application file for complete search history.

(56) References Cited

U.S. PATENT DOCUMENTS

| | | | |
|---|---|---|---|
| 3,876,028 A | 4/1975 | Asano et al. | |
| 4,995,861 A * | 2/1991 | Erlbruch | F16H 3/54 475/145 |
| 5,679,095 A * | 10/1997 | Sekine | B60W 30/18027 477/116 |
| 5,853,348 A | 12/1998 | Lehman | |
| 11,933,390 B2 * | 3/2024 | Etchason | F16H 3/64 |

(Continued)

OTHER PUBLICATIONS

International Search Report and Written Opinion; PCT/US24/23349; Published: Aug. 2, 2024; Applicant: Delaware Capital Formation, Inc.

*Primary Examiner* — Roger L Pang
(74) *Attorney, Agent, or Firm* — Fish & Richardson P.C.

(57) ABSTRACT

A system for preventing shifting between a plurality of gear ratios in a mechanical gearset. An operating sensor detecting rotation of a moving component in the mechanical gearset, a shift solenoid controlling shifting among the plurality of gear ratios, and a microcontroller communicatively coupled to the shift solenoid and the operating sensor that prevents activation of the shift solenoid when rotation is detected by the rotation sensor.

18 Claims, 5 Drawing Sheets

(56) References Cited

U.S. PATENT DOCUMENTS

| | | |
|---|---|---|
| 2006/0112777 A1 | 6/2006 | Miyazaki |
| 2010/0049411 A1* | 2/2010 | Matsunaga ............. F16H 61/16 |
| | | 701/52 |
| 2014/0350808 A1 | 11/2014 | Tachibanada et al. |
| 2017/0138468 A1* | 5/2017 | Fiore ................... F16H 61/0403 |
| 2022/0243808 A1 | 8/2022 | Amano et al. |

* cited by examiner

GEARBOX SHIFT LOCKOUT SYSTEM

CROSS-REFERENCE TO RELATED CASES

This application claims the benefit of U.S. provisional patent application Ser. No. 63/457,225, filed on Apr. 5, 2023, and incorporates such provisional application by reference into this disclosure as if fully set out at this point.

FIELD OF THE INVENTION

This disclosure relates to shift lockout systems in general and, more specifically, to shift lockout and protection systems for mechanical gearboxes.

BACKGROUND OF THE INVENTION

Various gear sets can be used to vary input/output ratios of a gearbox. Pluralities of gear ratios may be selected by disengaging or engaging various components within the gearing system. One component having selectable inputs/outputs to vary drive ratios is a planetary gearset. Some devices employ multiple planetary gearsets to achieve desired operations and ratios. However, disengaging or engaging any gearing components during active operations can lead to damage or failure of components of the entire gearbox.

Damage to a planetary gearbox during shifting is an issue known within the relevant industries. Hydrostatic clutches may enable shifting of gearboxes relying on planetary gearsets during operations, but this solution involves substantial additional cost and complexity, and can change the operation of the gearbox in a way that is not necessarily needed or desired by an end user.

Therefore, what is needed is a system and method for addressing this and other issues.

SUMMARY OF THE INVENTION

The invention of the present disclosure, in one aspect thereof, comprises a system for preventing shifting between a plurality of gear ratios in a mechanical gearset. The system includes a rotation sensor detecting rotation of a moving component in the mechanical gearset, a shift solenoid controlling shifting among the plurality of gear ratios, and a microcontroller communicatively coupled to the shift solenoid and the rotation sensor that prevents activation of the shift solenoid when rotation is detected by the rotation sensor.

In some embodiments, the rotation sensor comprises a Hall effect sensor. The moving component may comprise a planetary gearset. The moving component may comprise a target ring affixed to a carrier of a planetary gearset.

In some cases, the moving component comprises a compound planetary gearset having a plurality of stepped planetary gears with first and second gears on a common axis providing first and second output ratios at a planet carrier retaining the plurality of stepped planetary gears. The system may include an input shaft to the mechanical gearset, the mechanical input shaft being moveable between a first location engaged as a sun gear with the first gears of the plurality of planetary gears and a second location being engaged as the sun gear with the second gears of the plurality of planetary gears thereby effecting a first and second output ratio between the input shaft and the planet carrier respectively.

The invention of the present disclosure, in another aspect thereof, comprises a system for preventing shifting between a plurality of gear ratios in a mechanical gearset. Such system includes an operating sensor providing a signal indicative of the mechanical gearset being in operation, a shift solenoid and valve block controlling shifting among the plurality of gear ratios in the gearset, and a microcontroller communicatively coupled to the shift solenoid and the rotation sensor that prevents activation of the shift solenoid when the mechanical gearset is in operation.

The operating sensor may comprise a Hall-effect sensor detecting movement of the mechanical gearset. The Hall-effect sensor may sense rotation of a target ring affixed to a planet carrier of a planetary gearset.

In other embodiments, the operating sensor is a hydraulic sensor detecting flow of hydraulic fluid powering a hydraulic motor powering the mechanical gearset.

The microcontroller may receive an input shift command but does not send a signal to the solenoid in response to the command when the operating sensor indicates operation of the mechanical gearset. In some cases the microcontroller receives an input shift command but does not send a signal to the solenoid in response to the command when the operating sensor indicates operation of the mechanical gearset, until after outputting a stop signal from the microprocessor that causes an input drive to the mechanical gearset to cease operation.

The mechanical gearset may include a first compound planetary gearset having a plurality of stepped planetary gears with first and second gears on a common axis providing first and second output ratios at a planet carrier retaining the plurality of stepped planetary gears such that the planet carrier rotates when either the first or second gears are rotated by a sun gear. In such case the operating sensor comprises a Hall-effect sensor detecting rotation of a target ring affixed to the planet carrier.

In some embodiments, shifting between the first and second ratios is effect by movement of an input shaft having a sun gear on a proximal end thereof to rotate the first or second gears. The input shaft may be moved by a hydraulic piston affixed to a distal end thereof. The hydraulic piston may be moved in response to fluid flow from the valve block as controlled by the solenoid signaled by the microprocessor.

In some embodiments, the planet carrier of the first compound planetary gearset drives a sun gear of a second planetary gearset having a planet carrier affixed to an output shaft of the gearset.

The invention of the present disclosure, in another aspect thereof, comprises a method for preventing shifting of a mechanical gearset when the gearset is in operation comprising. The method includes providing an operating sensor detecting rotation of an internal component of the mechanical gearset, and providing a microcontroller communicatively coupled to the operating sensor. The microcontroller prevents a shift solenoid of the mechanical gearset from initiation a change of input/output ratio of the mechanical gearset when the internal component of the mechanical gearset is rotating.

Providing an operating sensor may further comprises providing a Hall-effect sensor and a target ring on the internal component such that rotation of the internal component moves the target ring to be detected by the Hall-effect sensor. Providing a target ring on the internal component may further comprise providing the target ring on a planet carrier in the mechanical gearset that moves whenever the mechanical gearset is in operation.

In some cases the microcontroller prevents the shift solenoid from initiating the change by blocking a received electronic shift signal from being sent to the solenoid. The microcontroller may propagates the received electronic shift signal to the when the operating sensor does not detect rotation of the internal component of the mechanical gearset.

DETAILED DESCRIPTION OF THE PREFERRED EMBODIMENTS

Figure 1:
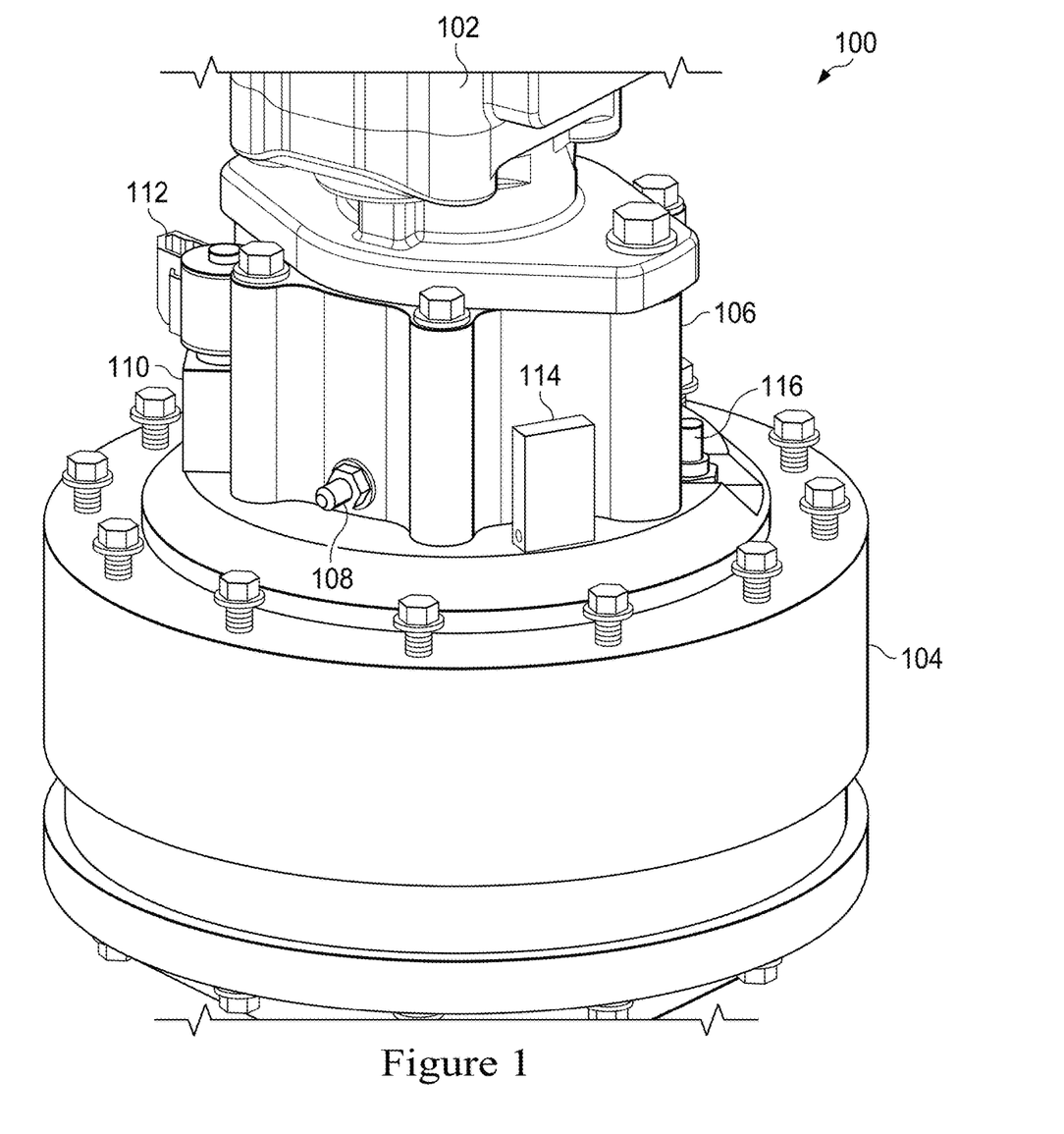
FIG. 1 is a closeup perspective view of one embodiment of a gearbox with a gearbox shift lockout system according to aspects of the present disclosure.

Referring now to FIG. 1, is a closeup perspective view of one embodiment of a gearbox with a gearbox shift lockout system 100 according to aspects of the present disclosure is shown. The system 100 comprises an input drive 102, which may comprise an electrical or hydraulic motor. The input speed and torque coming from the input drive 102 can be converted by varying an output drive ratio with a gearbox 104. One or more planetary gearsets may be provided within the gearbox 104. Input/output ratios of one or more planetary gearsets can be adjust or varied by locking various components within the gearsets (e.g., sun gears, planetary gears, planet carriers, etc.) together and to input/output shafts. Ratios can be varied or changed by movement of idler gears, sliding input/output shafts, couplers and other components and to include or exclude entire gear sets or parts of gearsets from receiving or transmitting power.

In the system 100 a shifting mechanism 106 interposes the power source 102 and the gearbox 104 to effect shifting operations of planetary gearsets within the gearbox 104. Externally, a shifting mechanism 106 may include a shift port 108. In some embodiments, the shift port 108 provides hydraulic power to the gearbox 104 and/or internal components of the shifting mechanism 106 itself. In some embodiments, actual shifting operations are signaled or controlled by a solenoid 112 that may be affixed to a valve block 110. As is known in the art, a solenoid such as solenoid 112 can alter hydraulic flow within a valve block such as valve block 110 to activate or deactivate various actuators that shift the gearbox 104 or change its input/output ratio.

For gearboxes and gearsets that do not have clutches to engage/disengage from the source of power and/or from an output load, shifting may need to be restricted to times when some or all of the gears within the gearbox 104 are stationary. In the present embodiment, an operating sensor 116 detects when the gearbox 104 is operational. In some embodiments, the sensor 116 comprises a Hall effect sensor. A logic box 114 comprises or contains a microcontroller, a microprocessor, another programmed silicon component, or an analog circuit that reads output from the operating sensor 116 and prevents shift signals from reaching the solenoid 112 when the gearbox 104 is operational.

Figure 2:
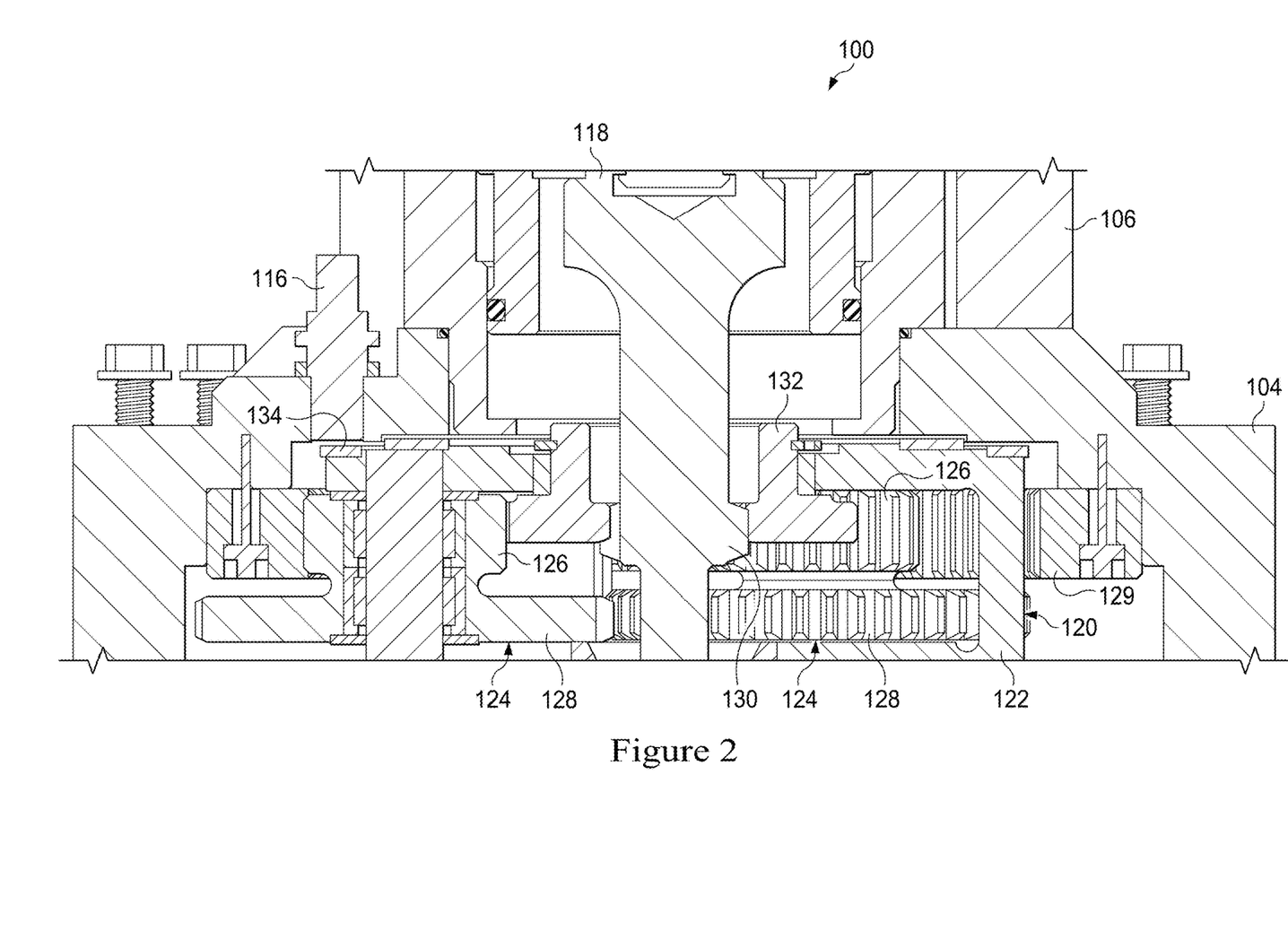
FIG. 2 is a closeup side cutaway view of the gearbox with gearbox shift lockout system of FIG. 1.

Referring now to FIG. 2, a closeup side cutaway view of the gearbox with gearbox shift lockout system 100 of FIG. 1 is shown. The gearbox 104 can be seen to contain a first planetary gearset 120. The gearset 120 is a compound planetary gearset with stepped planet gears 124 in a planet carrier 122. Planet gears 124 each have a small radius planet gear 126, which meshes with a fixed ring gear 129. Fixed coaxially to each small radius planet gear 126 is a large radius planet gear 128. With respect to the planet gears 126, 128, the terms 'small' and 'large' are relative terms meaning that a varying output ratio from the planetary gearset 120 is obtained based on which planet gears 126, 128 are driven via a sun gear.

A moveable or slidable input shaft 118 (e.g., the output from the power source 102) engages on a geared portion 130 with an upper planet gear 132 that is meshed with the small radius planet gears 126 when the shaft is in a retracted position (as shown in FIG. 2). When the gearbox 104 is shifted, the input shaft 118 moves (extends or retracts). When the input shaft 118 is in an extended position, the geared portion 130 moves into mesh with the large radius planet gears 128 and acts directly as a sun gear. This reduces the output ratio which is taken from planet carrier 122. Planet carrier 122 may connect to the final output, or to additional gearing stages.

As the planet carrier 122 is in rotation any time the gear box 104 is operational, this the planet carrier 112 can provide a suitable location for a target ring 134 for the sensor 116. The sensor 116 detects movement (rotation) of the target ring 134 which is read via an electronic signal to the logic box 114 which will prevent the shift solenoid 112 from activating to move the input shaft 118, which would shift the gearbox 114. In some embodiments, the sensor 116 may detect rotation of the planet carrier 122 directly such that a target ring 134 is not needed.

Figure 3:
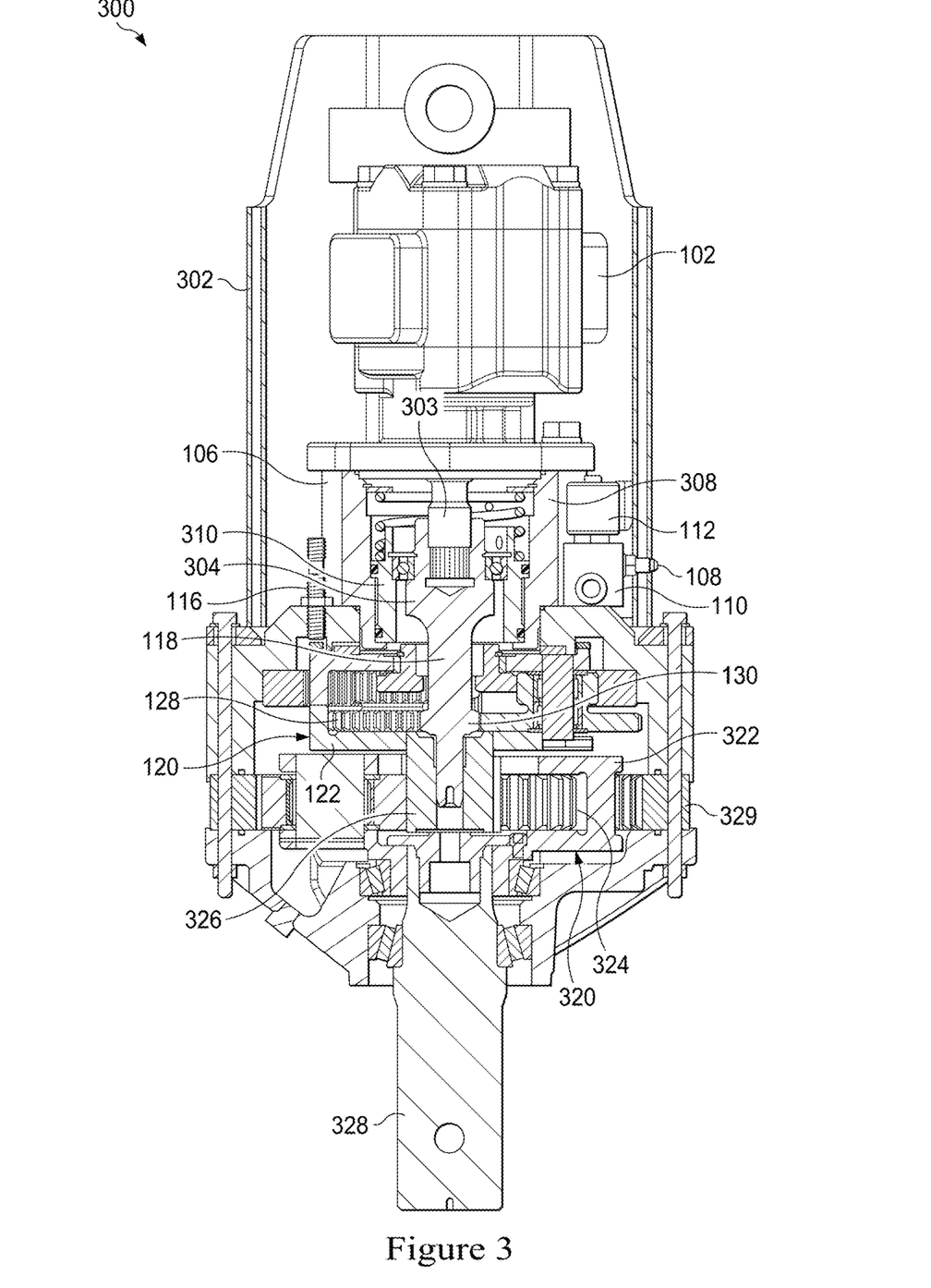
FIG. 3 is a side cutaway view of another embodiment of a gearbox with a gearbox shift lockout system according to aspects of the present disclosure.

Referring now to FIG. 3 is a side cutaway view of another embodiment of a gearbox with a gearbox shift lockout system 300 according to aspects of the present disclosure is shown. In the system 300, the shifting mechanism 106 and the power source 102 reside in an upper housing 302. The sensor 116, the valve block 110, and/or the solenoid 112 may also be protected within the housing. In the system 300, the shift port 108 may extend directly from the valve block 110 through the housing 302.

The power source 102 may have an output shaft 303 that is splined into a distal or upper end 304 of the input shaft 118 to the gearbox 104. As part of the shifting mechanism 106 hydraulic cylinder 308 may contain an hydraulic piston 310 that is affixed to the distal end 304 or some other portion of the input shaft 118 to allow the shaft to be translated along its axis of rotation to effect shifting of the gearbox 104. Movement of the piston 310 may be controlled via the valve box 110 and solenoid 112 as limited by the logic box 114 as described herein.

The present embodiment provides a second planetary gearset 320. This second planetary gearset 320 may comprise a planet carrier 322 containing a plurality of planet gears 324 (three planet gears, for example). The planet gears 324 may mesh with a static ring gear 329 and well as a sun gear 326. The sun gear 326 may be fixed to the output from the first planetary gearset 120 (e.g., fixed to planet carrier 122). A final output shaft 328, used to provide rotation and torque to perform work, may be fixed to the planet carrier 322. Thus the second planetary gearset 320, if present, provides an additional reduction gearing.

Figure 4:
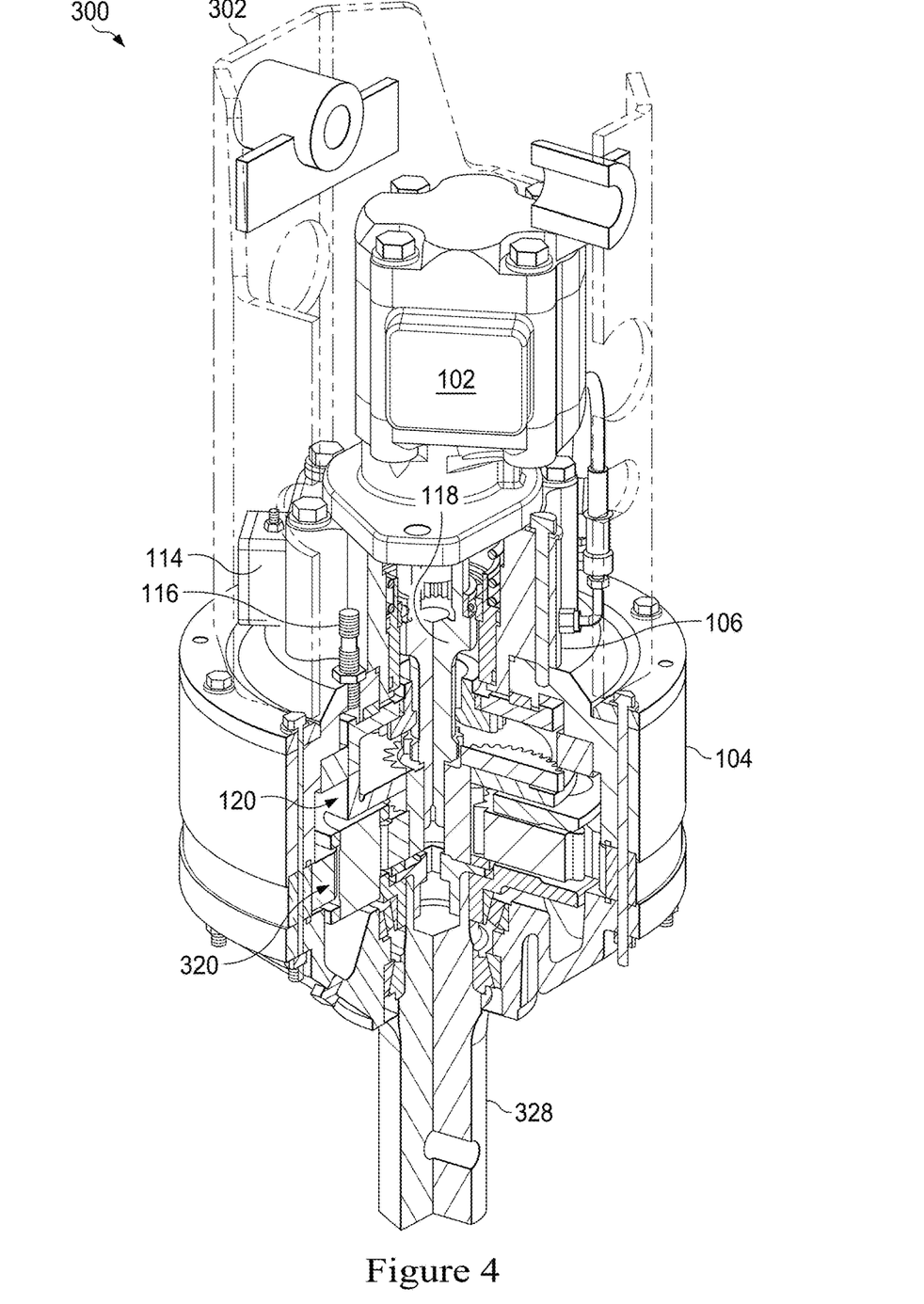
FIG. 4 is a perspective quarter cutout view of the gearbox with shift lockout system of FIG. 3.

Referring now to FIG. 4, a perspective quarter cutout view of the gearbox with shift lockout system 300 of FIG.

3 is shown. Here, one potential physical location for the logic box 114 within the housing 302 can be seen.

It should be understood that, in other embodiments, the operating sensor 116 can be placed and configured to detect rotation of any specific gear within the gearbox 104. This may include, without limitation an input shaft or gear, an output shaft or gear, a ring gear, a planet gear, a planet carrier, a sun gear, or another component within the gearbox that may or may not need a target device separately attached thereto. While specific examples of gearing arrangements are provided herein, one of skill in the art will appreciate that systems of the present disclosure can be adapted for use with gearsets, arrangements, and shifting mechanisms that differ from those explicitly shown.

Figure 5:
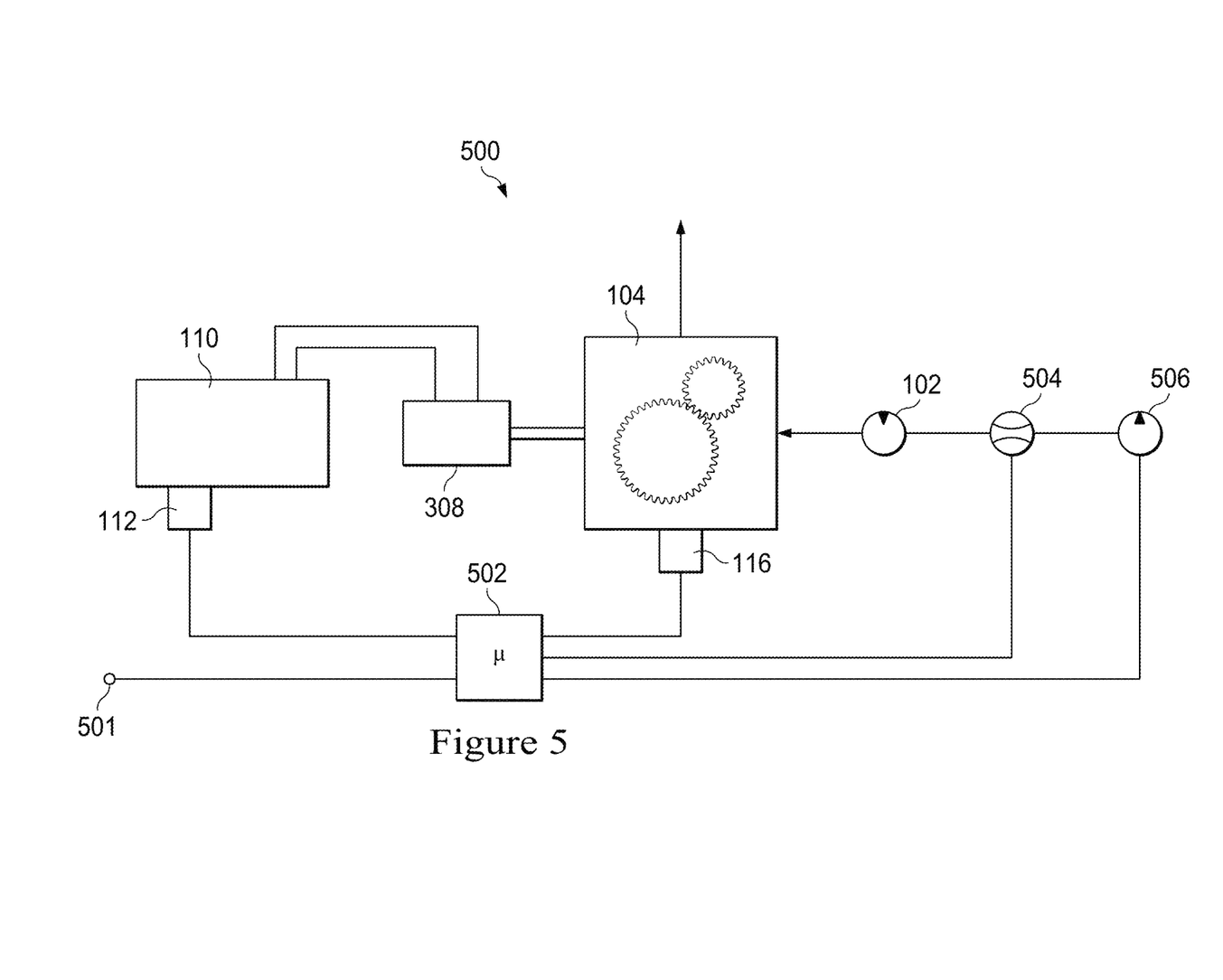
FIG. 5 is a simplified schematic of another embodiment gearbox shift lockout system according to aspects of the present disclosure.

FIG. 5 is a simplified schematic of another embodiment gearbox shift lockout system 500 according to aspects of the present disclosure. The schematic representation of FIG. 5 is intended to provide a logical view of operations and does not necessarily represent the physical appearance of the system (s). As before, the solenoid 112 may control shifting operations of the gearbox 104. Valve block 110 may, via opening or closing of the solenoid 112 provide for internal hydraulic flow to operate hydraulic cylinder 308 adjusting input/output ratios based on (re) configuration of internal gearing such as planetary gearsets or other gearing arrangements known to the art.

A microcontroller 502 may be a component of the logic box 114, or may be utilized instead of the logic box where a full box and housing is not needed. In some embodiments, the microcontroller 502 receives shift signals via input 501. In other embodiments, shift signals are provided directly to the solenoid but are blocked or locked out when shifting is not allowed. The microcontroller 502 may detect movement of specific gear(s) in the gearbox 104 by use of Hall effect sensor 116 or other sensors affiliated with the gearbox 104.

In addition to, or instead of, preventing shifting by preventing a signal from reaching the solenoid 112 (or withholding a received signal), the microcontroller 502 halt power to the input drive 102. In the example shown, input drive 102 is a hydraulic motor. The microcontroller 502 may therefore stop an associated hydraulic pump 506 driving the motor 102. If the input drive 102 is an electric motor, electricity may be shut off by the microcontroller. If the input drive 102 is an internal combustion engine, the ignition may be switched off, etc.

In addition to, or instead of, using the sensor 116 to determine when the gearbox 104 is operational, flow or power to the input drive may be monitored. As shown, a hydraulic flow meter 504 may be used to determine if the motor 102 is turning and therefore utilizing the gearbox 104. If the motor 102 is an electric motor, current/voltage may be measured, etc.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Like reference numerals represent like parts in the drawings.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

The term "selective" or "selectively," unless otherwise indicated, is taken to mean that the operation or function is capable of being performed by the structure or device in reference, but the operation or function may not occur continuously or without interruption. Furthermore, a selective or selectively performed operation may be one that the user or operator of a device or method may choose whether or when to perform, but the function or operation is nevertheless fully operative on or within the relevant device, machine, or method and the same includes the necessary structure or components to perform such operation.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for preventing shifting between a plurality of gear ratios in a mechanical gearset comprising:
   a rotation sensor detecting rotation of a moving component in the mechanical gearset;
   a shift solenoid controlling shifting among the plurality of gear ratios; and
   a microcontroller communicatively coupled to the shift solenoid and the rotation sensor that prevents activation of the shift solenoid when rotation is detected by the rotation sensor
   wherein the moving component comprises a compound planetary gearset having a plurality of stepped planetary gears with first and second gears on a common axis providing first and second output ratios at a planet carrier retaining the plurality of stepped planetary gears.

2. The system of claim 1, wherein the rotation sensor comprises a Hall effect sensor.

3. The system of claim 1, wherein the moving component comprises a planetary gearset.

4. The system of claim 1, wherein the moving component comprises a target ring affixed to a carrier of a planetary gearset.

5. The system of claim 1, further comprising:
   an input shaft to the mechanical gearset, the mechanical input shaft being moveable between a first location engaged as a sun gear with the first gears of the plurality of planetary gears and a second location being engaged as the sun gear with the second gears of the plurality of planetary gears thereby effecting a first and second output ratio between the input shaft and the planet carrier respectively.

6. A system for preventing shifting between a plurality of gear ratios in a mechanical gearset comprising:
   an operating sensor providing a signal indicative of the mechanical gearset being in operation;
   a shift solenoid and valve block controlling shifting among the plurality of gear ratios in the gearset; and
   a microcontroller communicatively coupled to the shift solenoid and the operating sensor that prevents activation of the shift solenoid when the mechanical gearset is in operation
   wherein the microcontroller is configured to, in response to receiving an input shift command and the operating sensor indicating operation of the mechanical gearset, output a stop signal that causes an input drive to the mechanical gearset to cease operation before sending a signal to the shift solenoid.

7. The system of claim 6, wherein the operating sensor comprises a Hall-effect sensor detecting movement of the mechanical gearset.

8. The system of claim 7, wherein the Hall-effect sensor senses rotation of a target ring affixed to a planet carrier of a planetary gearset.

9. The system of claim 6, wherein the operating sensor is a hydraulic sensor detecting flow of hydraulic fluid powering a hydraulic motor powering the mechanical gearset.

10. The system of claim 6, wherein the microcontroller receives an input shift command but does not send a signal to the solenoid in response to the command when the operating sensor indicates operation of the mechanical gearset.

11. The system of claim 6, wherein:
    the mechanical gearset comprises a first compound planetary gearset having a plurality of stepped planetary gears with first and second gears on a common axis providing first and second output ratios at a planet carrier retaining the plurality of stepped planetary gears such that the planet carrier rotates when either the first or second gears are rotated by a sun gear; and
    the operating sensor comprises a Hall-effect sensor detecting rotation of a target ring affixed to the planet carrier.

12. The system of claim 11, wherein:
    shifting between the first and second ratios is effect by movement of an input shaft having a sun gear on a proximal end thereof to rotate the first or second gears;
    the input shaft is moved by a hydraulic piston affixed to a distal end thereof; and
    the hydraulic piston is moved in response to fluid flow from the valve block as controlled by the solenoid signaled by the microprocessor.

13. The system of claim 12, wherein the planet carrier of the first compound planetary gearset drives a sun gear of a second planetary gearset having a planet carrier affixed to an output shaft of the gearset.

14. A method for preventing shifting of a mechanical gearset when the gearset is in operation comprising:
    providing an operating sensor detecting rotation of an internal component of the mechanical gearset; and
    providing a microcontroller communicatively coupled to the operating sensor;
    wherein, in response to receiving an input shift command and the operating sensor indicating the internal component of the mechanical gearset is rotating, the microcontroller prevents a shift solenoid of the mechanical gearset from initiating a change of input/output ratio of the mechanical gearset and outputs a stop signal that causes an input drive to the mechanical gearset to cease operation.

15. The method of claim 14, wherein providing an operating sensor further comprises providing a Hall-effect sensor and a target ring on the internal component such that rotation of the internal component moves the target ring to be detected by the Hall-effect sensor.

16. The method of claim 15, wherein providing a target ring on the internal component further comprises providing the target ring on a planet carrier in the mechanical gearset that moves whenever the mechanical gearset is in operation.

17. The method of claim 15, wherein the microcontroller prevents the shift solenoid from initiating the change by blocking a received electronic shift signal from being sent to the solenoid.

18. The method of claim 17, wherein the microcontroller propagates the received electronic shift signal to the shift solenoid when the operating sensor does not detect rotation of the internal component of the mechanical gearset.

\* \* \* \* \*